United States Patent Office 3,756,905
Patented Sept. 4, 1973

3,756,905
FILAMENTARY-PLASTIC COMPOSITE LAMINATE
George J. Mills, Santa Ana, and Gary G. Brown, Diamond Bar, Calif., assignors to Northrop Corporation, Los Angeles, Calif.
Filed Dec. 20, 1971, Ser. No. 209,862
Int. Cl. B32b 5/12
U.S. Cl. 161—60      4 Claims

ABSTRACT OF THE DISCLOSURE

A plastic laminate is formed from layers of composite material made from filaments which have been impregnated with a plastic binder.

Figure 1:
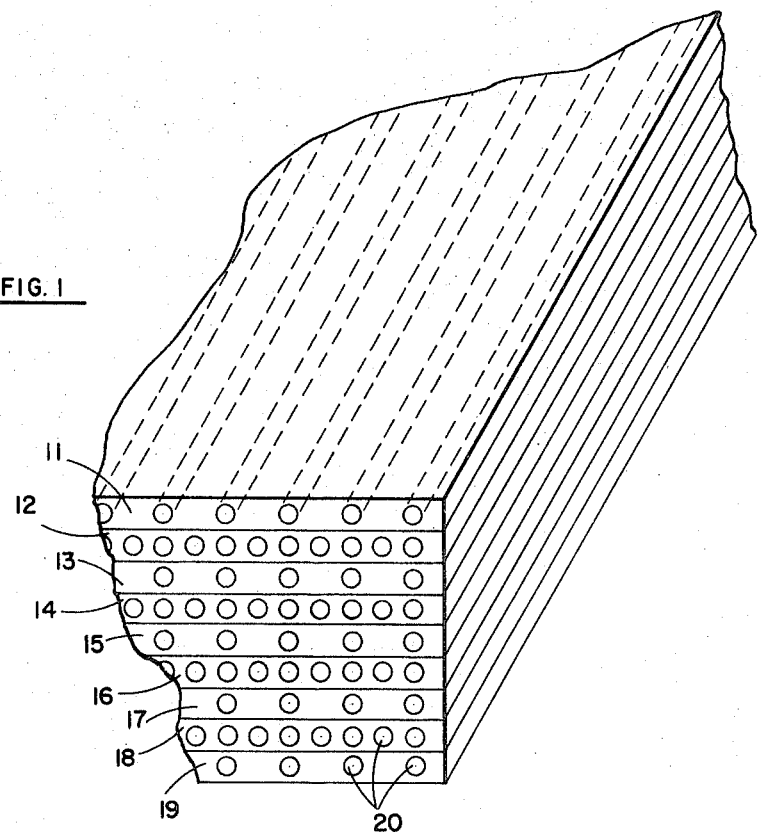

A substantial improvement in the structural characteristics of the laminate is achieved by alternating filament rich layers of composite material with resin rich layers of composite material in forming the laminate structure.

---

This invention relates to filamentary-plastic composites, and more particularly to a laminate formed from a plurality of layers of such composite material.

Structural materials having a high strength to weight ratio and capable of withstanding high temperatures have been fabricated from sheets of filamentary-plastic composite material which are laminated together. The composite layers are generally formed from filament strings of material such as boron, quartz, fiberglass, graphite, etc., which are molded in a resin binder such as epoxy resin and polyimide resin. In view of the inherently greater strength of the filaments than the resin binder, it has generally been assumed that a greater strength composite can be produced with a greater volume of filaments in the overall composite. It has been discovered, however, that the primary failure mode involves single filament failure indicating that weak spots along the filament length is the most important factor in determining the strength of the composite. This is because a single filament failure tends to propagate a crack through the resin to adjacent filaments throughout the cross-section of the composite; i.e., with the breaking of a single filament the load released is transferred to adjacent filaments.

The composite of this invention provides means for resisting the propagation across the composite cross section of cracks which originate at filament failure sites, thus increasing the effective strength characteristics of the composite material. This end result is achieved by alternating or intermixing layers of filament-rich and resin-rich composite material in forming the laminate. In this manner, the high filament content layers serve to support a higher proportion of the load, with the lower percentage filament layers serving to arrest or block cracks which may be initiated in the higher filament content layer while still supporting a proportion of the load.

It is therefore an object of this invention to improve the structural characteristics of plastic filamentary composites.

It is another object of this invention to minimize the effect of a single filament failure in a filamentary plastic composite.

It is still another object of this invention to provide a laminated filamentary plastic composite having optimum strength characteristics.

Other objects of this invention will become apparent as the description proceeds in connection with the accompanying drawings.

Briefly described, the device of the invention comprises a laminated filamentary plastic composite which is formed from layers of material which may comprise elongated filament strings of a material such as boron, quartz, graphite, etc., which are molded in a resin binder such as polyimide resin or epoxy resin. Alternate or intermixed layers of the laminate thus formed are successively filament rich and resin rich by volume. Typically, a resin rich layer would have about 60% resin by volume, while a filament rich layer would have approximately 75% filament by volume. It was found that a marked improvement in tensile strength of the end product was achieved.

Figure 2:
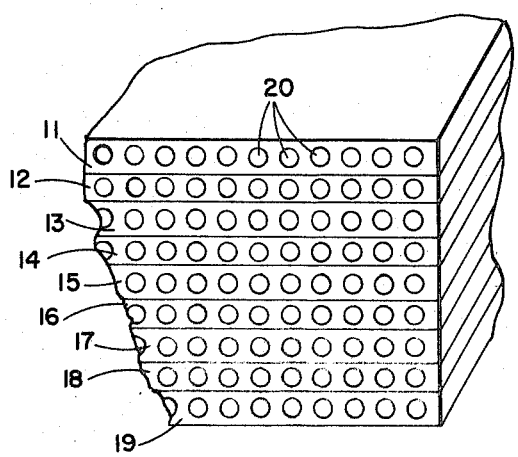

FIG. 1 illustrates one embodiment of the laminated composite of the invention, and FIG. 2 illustrates another embodiment of the laminated composite of the invention.

Referring now to FIG. 1, a laminated composite is formed from a plurality of layers 11–19 which are molded together. Each of the layers is formed from a plurality of elongated filaments 20 which extend through the entire length thereof. These filaments may be of a material such as boron, quartz, fiberglass, graphite, etc. The filaments 20 are molded in a plastic binder which may be of material such as epoxy resin or polyimide resin. Layers 11, 13, 15, 17 and 19 are resin or polyimide resin. layers 12, 14, 16 and 18 are filament rich.

Referring now to FIG. 2, a second embodiment of the invention is illustrated. This embodiment differs from the first in that the same number of filaments 20 are used for each layer. However, the resin rich layers 11, 13, 15, 17 and 19 have more resin by volume than the filament rich layers 12, 14, 16 and 18.

Typical examples which illustrate how the composite of the invention may be formed will now be given.

EXAMPLE I

A composite as shown in the figures was formed utilizing boron filaments molded in polyimide resin. Resin-rich layers 11, 13, 15, 17 and 19 were 41% by volume boron and 59% resin, while filament-rich layers 12, 14, 16 and 18 were 76.6% by volume boron and the balance resin. The layers were pressed against each other at a pressure of 200 p.s.i. and brought to and held at a temperature of 580° F. for one hour to cure the part. The composite so produced was tested and found to have a tensile strength of 200,000 p.s.i. This is as compared with a 120,000 p.s.i. average strength normally experienced with a 52% boron by volume homogeneous composite. (It is estimated that the average fiber volume of the composite made in accordance with "Example I" is 52%.)

EXAMPLE II

A composite formed of five resin-rich layers corresponding to layers 11, 13, 15, 17 and 19 in the figures, and four filament-rich layers corresponding to layers 12, 14, 16 and 18, were molded together to form the composite. The resin-rich layers were 59% by volume of polyimide resin. The filament-rich layers were 76.6% by volume boron. The layers were placed against each other under contact pressure in a cold press and then heated to 390° F. 200 p.s.i. pressure was then applied to the composite, while the temperature was raised to 590° F. The part was then cured at 590° F. for one half-hour at 200 p.s.i. The part was tested and found to have tensile strength of over 200,000 p.s.i.

The composite of this invention is thus found to exhibit highly improved tensile strength for a given filament density as compared with similar prior art composites.

While the composite material of this invention has been described and illustrated in detail, it is to be clearly understood that this is intended by way of illustration and example only and is not to be taken by way of limitation, the spirit and scope of this invention being limited only by the terms of the following claims.

We claim:

1. A filamentary resin laminated composite comprising:
    a first group of layers formed from elongated filaments molded in a resin binder, the filaments extending through substantially the entire extent of said layer, said first group of layers being resin-rich, and
    a second group of layers alternated with said first mentioned group, said second group of layers being formed from filaments molded in a plastic binder, said filaments extending through substantially the entire extent of said layers, said second group of layers being filament-rich, said layers being molded together to form a unitary composite.

2. The composite of claim 1 wherein said filaments are of boron and said plastic is polyimide resin.

3. The composite of claim 1 wherein said layers are formed from boron polyimide tape.

4. The composite of claim 1 wherein said plastic-rich layers are substantially 60% plastic by volume, and said filament-rich layers are substantially 75% filaments by volume.

References Cited

UNITED STATES PATENTS 3,691,000   9/1972   Kalnin _____ 161—60

WILLIAM A. POWELL, Primary Examiner

U.S. Cl. X.R.

161—143